United States Patent
Chen

(10) Patent No.: US 9,520,777 B2
(45) Date of Patent: Dec. 13, 2016

(54) TIME SIGNAL GENERATOR AND TIME SIGNAL GENERATING METHOD

(71) Applicant: uPI Semiconductor Corp., Hsinchu County (TW)

(72) Inventor: Ya-Ping Chen, Hsinchu County (TW)

(73) Assignee: uPI Semiconductor Corp., Hsinchu County (TW)

(*) Notice: Subject to any disclaimer, the term of this patent is extended or adjusted under 35 U.S.C. 154(b) by 130 days.

(21) Appl. No.: 14/265,363

(22) Filed: Apr. 30, 2014

(65) Prior Publication Data

US 2015/0077080 A1 Mar. 19, 2015

(30) Foreign Application Priority Data

Sep. 17, 2013 (TW) .............................. 102133716 A

(51) Int. Cl.
*H02M 3/158* (2006.01)
*H02M 3/156* (2006.01)
*H02M 1/00* (2006.01)

(52) U.S. Cl.
CPC .......... *H02M 3/156* (2013.01); *H02M 3/1588* (2013.01); *H02M 2001/0025* (2013.01); *H02M 2003/1566* (2013.01); *Y02B 70/1466* (2013.01)

(58) Field of Classification Search
CPC .... H02M 3/156; H02M 3/158; H02M 3/1566; H02M 2001/0025; H02M 3/1588; Y02B 70/1466
See application file for complete search history.

(56) References Cited

U.S. PATENT DOCUMENTS

| 7,208,921 B2 | 4/2007 | Walters |
| 7,834,606 B2 | 11/2010 | Liu et al. |
| 7,863,875 B1 | 1/2011 | Guo et al. |
| 2005/0018458 A1* | 1/2005 | Shimada ............ H02M 1/4225 363/125 |
| 2008/0062731 A1 | 3/2008 | Chang et al. |
| 2008/0315851 A1* | 12/2008 | Akiyama ............ H02M 3/1588 323/284 |
| 2010/0033153 A1* | 2/2010 | Xing ................... H02M 3/156 323/288 |

(Continued)

FOREIGN PATENT DOCUMENTS

| CN | 101981793 | 2/2011 |
| CN | 102082498 | 6/2011 |

(Continued)

OTHER PUBLICATIONS

"Office Action of Taiwan Counterpart Application", issued on Mar. 26, 2015, p. 1-4, in which the listed references were cited.

(Continued)

*Primary Examiner* — Gustavo Rosario Benitez
(74) *Attorney, Agent, or Firm* — Jianq Chyun IP Office

(57) ABSTRACT

A time signal generator and a time generating method used in a power converter are provided. The time generating method includes following steps. An error delay signal is generated according to an error signal, wherein the error signal is related to an output voltage of the power converter. A time signal is generated according to the error signal and the error delay signal. The time signal may serve to improve a response speed of the power converter.

22 Claims, 7 Drawing Sheets

(56) References Cited

U.S. PATENT DOCUMENTS

| | | | |
|---|---|---|---|
| 2010/0072964 A1* | 3/2010 | Qiu .................... | H02M 3/156 323/282 |
| 2010/0231189 A1 | 9/2010 | Chen et al. | |
| 2010/0320991 A1* | 12/2010 | Yoshino ............... | H02M 3/156 323/288 |
| 2011/0031948 A1* | 2/2011 | Chien .................. | H02M 3/156 323/282 |
| 2011/0304308 A1 | 12/2011 | Wan et al. | |
| 2011/0316495 A1* | 12/2011 | de Nie ................. | H02M 3/157 323/234 |
| 2012/0025793 A1 | 2/2012 | Tai et al. | |
| 2012/0217940 A1 | 8/2012 | Kiadeh et al. | |
| 2012/0306586 A1 | 12/2012 | Wan et al. | |
| 2013/0207563 A1* | 8/2013 | Hamamoto ............ | G05F 1/468 315/210 |

FOREIGN PATENT DOCUMENTS

| | | |
|---|---|---|
| JP | 2004056983 | 2/2004 |
| TW | 591866 | 6/2004 |
| TW | 200711279 | 3/2007 |
| TW | 201008123 | 2/2010 |
| TW | I354433 | 12/2011 |

OTHER PUBLICATIONS

Office Action of China Counterpart Application, issued on Jul. 6, 2016, p. 1-p. 5.

* cited by examiner

TIME SIGNAL GENERATOR AND TIME SIGNAL GENERATING METHOD

CROSS-REFERENCE TO RELATED APPLICATION

This application claims the priority benefit of Taiwan application serial no. 102133716, filed on Sep. 17, 2013. The entirety of the above-mentioned patent application is hereby incorporated by reference herein and made a part of this specification.

BACKGROUND

Technical Field

The invention relates to a power conversion technique. Particularly, the invention relates to a time signal generator adapted to a power converter and a time signal generating method.

Related Art

FIG. 1 is a schematic diagram of a conventional power converter. FIG. 2 is a waveform diagram of the conventional power converter. Referring to FIG. 1 and FIG. 2, the conventional power converter 100 generally adopts a constant on time architecture. A ramp generator 140 generates a ramp signal Xramp having a constant triangular wave. A comparator 110 compares an error signal Xerr with the ramp signal Xramp to generate a comparison signal Xcm. A time control circuit 120 generates a pulse width modulation (PWM) signal Xpwm according to the comparison signal Xcm, an input voltage Vin and an output voltage Vout, where a width of an on time Ton of each period of the PWM signal Xpwm is a constant value, and the width of the on time Ton relates to the input voltage Vin and the output voltage Vout.

In the power converter 100, the comparator 110 generates the comparison signal Xcm according to the error signal Xerr and the ramp signal Xramp. The time control signal 120 determines the on time Ton for outputting the PWM signal Xpwm according to the comparison signal Xcm. An amplitude of the error signal Xerr relates to a feedback signal Vfb and a reference voltage Vref. At a moment for deciding the on time Ton for outputting the PWM signal Xpwm, the time control circuit 120 starts to calculate and generate the on time Ton, and the on time Ton of each period of the PWM signal Xpwm is constant.

Although the conventional operation architecture of pulse width modulation may achieve an effect of fixed frequency, when an equivalent series resistance ESR of a capacitor CL and an equivalent series resistance DCR of an inductor L on an output terminal of the power converter 100 are all very small, the energy compensated by the capacitor CL and the inductor L in response to a load transient variation is delayed, so that the feedback signal Vfb and the error signal Xerr are also delayed. The original error signal Xerr generated by the compensation circuit 130 cannot be used to converge the output voltage Vout. Moreover, since the on time Ton of the ramp signal Xramp is constant, a time length of the on time Ton cannot be changed along with the load transient variation. The above reasons lead to unstable oscillation of the output voltage Vout of the power converter 100.

FIG. 3 is a circuit diagram of the conventional time control circuit. Referring to FIG. 3, the time control circuit 320 includes a current source It, P-type metal oxide semiconductor (MOS) transistors MP1 and MP2, a switch S3, a capacitor C1 and a comparator 322. The current source It, the P-type MOS transistors MP1 and MP2 construct a current mirror. The current source It relates to the input voltage Vin. When the PWM signal has a logic high level, the inverted signal PWMB of the PWM signal has a logic low level, and the switch S3 is turned off. Moreover, when a current M*It obtained by multiplying the current source It by an M-multiple amplification coefficient is used to charge the capacitor C1 until a level of the charging voltage Xc is greater than the output voltage Vout, the comparator 322 ends counting the on time Ton.

FIG. 4 is a waveform diagram of a conventional counting mechanism capable of adjusting the on time. Referring to FIG. 4, the counting mechanism capable of adjusting the on time takes the error signal Xerr related to the output voltage as an upper boundary for ending the counting, especially in case of the load transient variation, variable counting is adopted. However, when the energy of the output voltage is sufficient, such counting mechanism keeps counting in order to increase the on time Ton.

FIG. 5 is a waveform diagram of a constant type counting mechanism and the counting mechanism capable of adjusting the on time of the conventional technique. Referring to FIG. 5, when the circuit structure of the power converter adopts the constant type counting mechanism, the related waveform thereof is the output voltage Vout and an inductor current IL illustrated in FIG. 5. When the circuit structure of the power converter adopts the counting mechanism capable of adjusting the on time, the related waveform thereof is the output voltage Vout1 and an inductor current IL1 illustrated in FIG. 5. Observing the waveform of the inductor current IL and the waveform of the inductor current IL1, it is known that a climbing speed of the waveform of the inductor current IL1 is faster.

As shown in FIG. 1, when an equivalent series resistance ESR of a regulation capacitor CL and an equivalent series resistance DCR of an inductor L at an output terminal are all very small, the original error signal Xerr generated by the compensation circuit 130 cannot provide enough stability to the loop, which may cause unstable oscillation of the output voltage Vout. Referring to FIG. 5 again, by observing the waveform of the inductor current IL1, it is known that a variation pattern of the current value of the inductor current IL1 is that the current value is first pulled high drastically and then pulled low drastically. The waveform of the inductor current IL1 presents several oscillations, and finally the current value is stabilized to a current value of a load current Iload. Although the counting mechanism capable of adjusting the on time can be used to ameliorate a settling time of the constant type counting mechanism, the waveform of the output voltage Vout1 is still oscillated, which is not specifically ameliorated actually.

SUMMARY

The invention is directed to a time signal generator adapted to a power converter and a time signal generating method for resolving the problem mentioned in the related art.

The invention provides a time signal generator, which is adapted to a power converter. The time signal generator includes an input unit, a delay unit, a time signal unit and a conversion control device. The delay unit is coupled to the input unit, and generates an error delay signal according to an error signal. The time signal unit is configured to provide a time signal. The conversion control device is coupled to the input unit, the delay unit and the time signal unit, and controls the time signal unit to generate the time signal according to the error signal and the error delay signal.

In an embodiment of the invention, the conversion control device receives a difference of the error signal and the error delay signal, and controls an operation of the time signal unit according to the difference.

In an embodiment of the invention, the conversion control device has a K-multiple amplification coefficient, and the conversion control device receives a difference of the error signal and the error delay signal, and multiplies the difference by the K-multiple amplification coefficient to control the operation of the time signal unit.

In an embodiment of the invention, the delay unit includes a resistor and a capacitor, where the resistor is coupled to the input unit and the conversion control device, and the capacitor is coupled to the resistor and the conversion control device.

In an embodiment of the invention, the time signal unit includes a comparator, and a first input terminal of the comparator is coupled to an output of the conversion control device.

In an embodiment of the invention, the time signal unit further includes a charging unit, and a second input terminal of the comparator is coupled to the charging unit.

In an embodiment of the invention, the time signal unit further includes a comparator and a charging unit, where a first input terminal of the capacitor receives the output voltage, and a second input terminal of the comparator is coupled to the charging unit and the conversion control device.

In an embodiment of the invention, when the conversion control device is a voltage-controlled voltage source device, the conversion control device provides a control signal to the time control unit, and the control signal changes a length of the time signal of the time signal unit along with a load transient variation of the power converter.

In an embodiment of the invention, when the conversion control device is a voltage-controlled current source device, the conversion control device drains a drain current from the time signal unit, and the drain current changes a length of the time signal of the time signal unit along with a load transient variation of the power converter.

The invention provides a time signal generator, which is adapted to a power converter. The time signal generator generates an error delay signal according to an error signal, and generates a time signal according to the error signal and the error delay signal, where the error signal relates to an output voltage of the power converter.

The invention provides another time signal generator, which is adapted to a power converter. The time signal generator includes an error signal adjustment circuit and a time signal unit. The error signal adjustment circuit receives an error signal to generate an error delay signal, where the error signal relates to an output voltage of the power converter. The time signal unit is coupled to the error signal adjustment circuit. The time signal unit generates a time signal according to a processing result of the error signal and the error delay signal.

In an embodiment of the invention, the error signal adjustment circuit includes an input unit, a delay unit and a conversion control device. The input unit receives the error signal. The delay unit is coupled to the input unit, and generates the error delay signal according to the error signal. The conversion control device is coupled to the input unit, the delay unit and the time signal unit, and controls the time signal unit to generate the time signal according to the error signal and the error delay signal.

The invention provides a time signal generating method, which is adapted to a power converter. The time signal generating method includes following steps. An error delay signal is generated according to an error signal, where the error signal relates to an output voltage of the power converter. A time signal is generated according to the error signal and the error delay signal.

In an embodiment of the invention, the step of generating the time signal according to the error signal and the error delay signal includes following steps. A difference of the error signal and the error delay signal is calculated, and the time signal is generated according to the difference.

In an embodiment of the invention, the step of generating the time signal according to the difference includes following steps. The difference is multiplied by a K-multiple amplification coefficient, and the time signal is generated according to the amplified difference.

According to the above descriptions, in the time signal generator and the time signal generating method of the invention, the time signal is generated according to the error signal and the error delay signal, so as to change a length of on time in response to the load transient variation. The time signal can serve to improve a response speed of the power converter, such that the output voltage is quickly returned to a stable state and the transient response speed is increased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
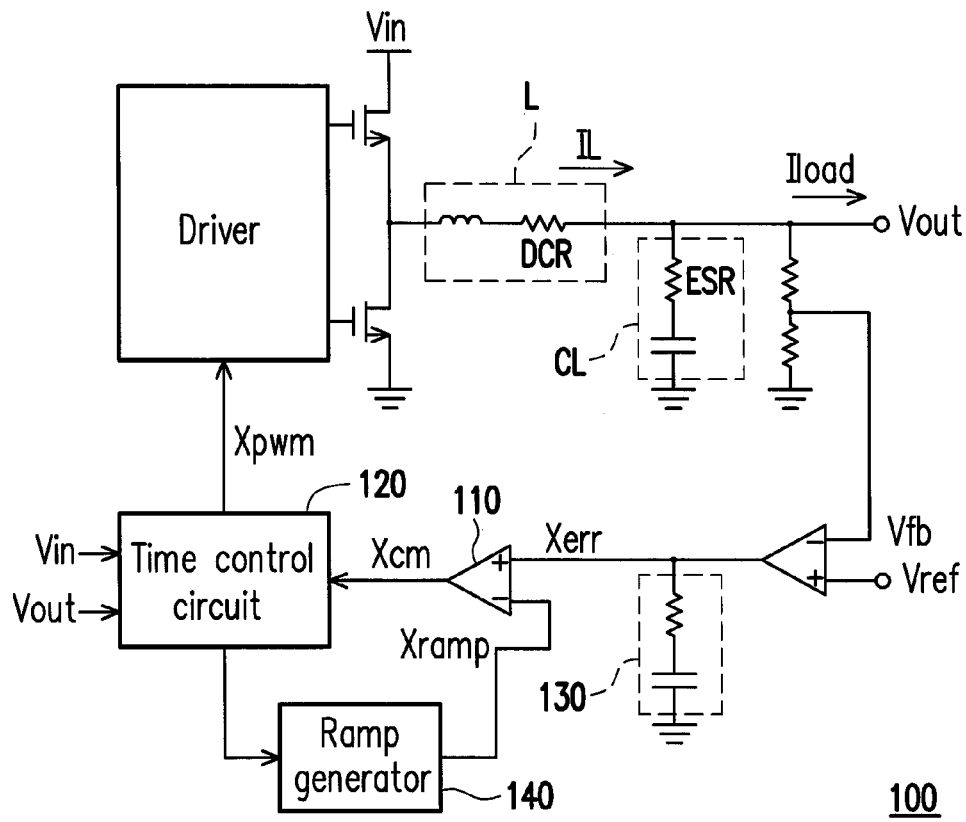
FIG. 1 is a schematic diagram of a conventional power converter.
Figure 2:
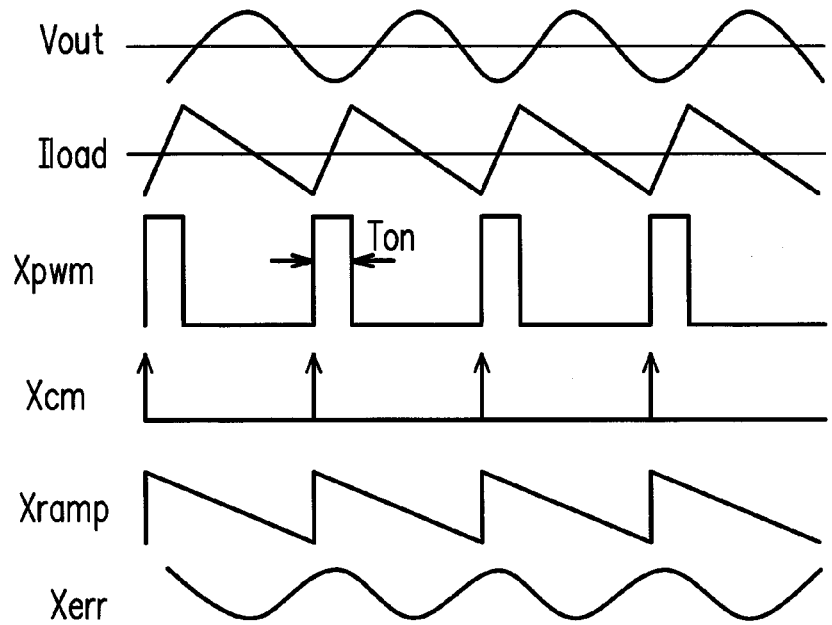
FIG. 2 is a waveform diagram of the conventional power converter.
Figure 3:
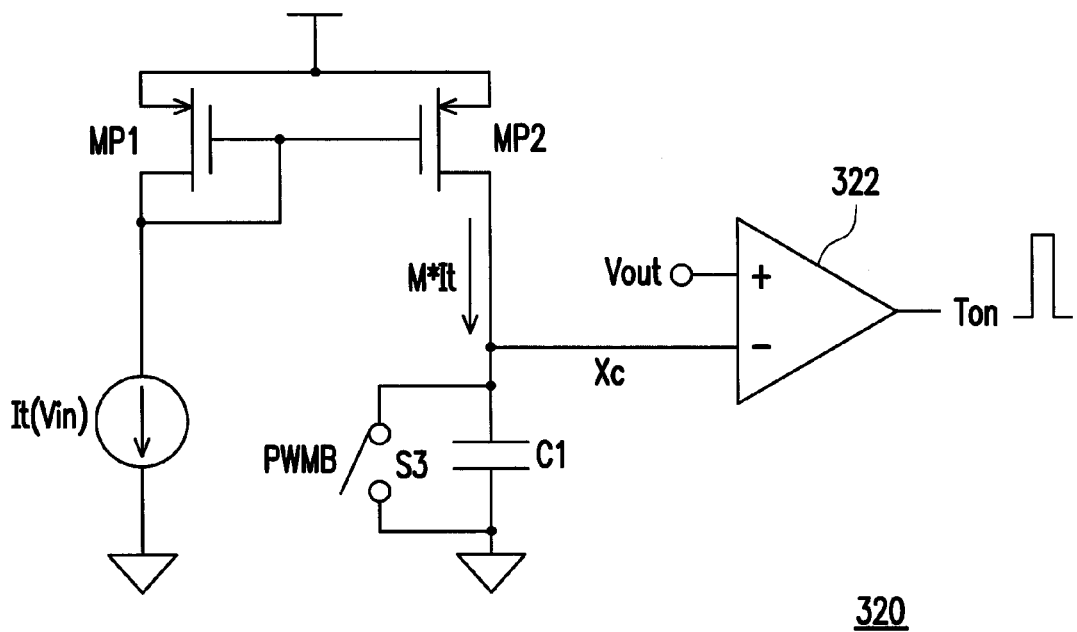
FIG. 3 is a circuit diagram of the conventional time control circuit.
Figure 4:
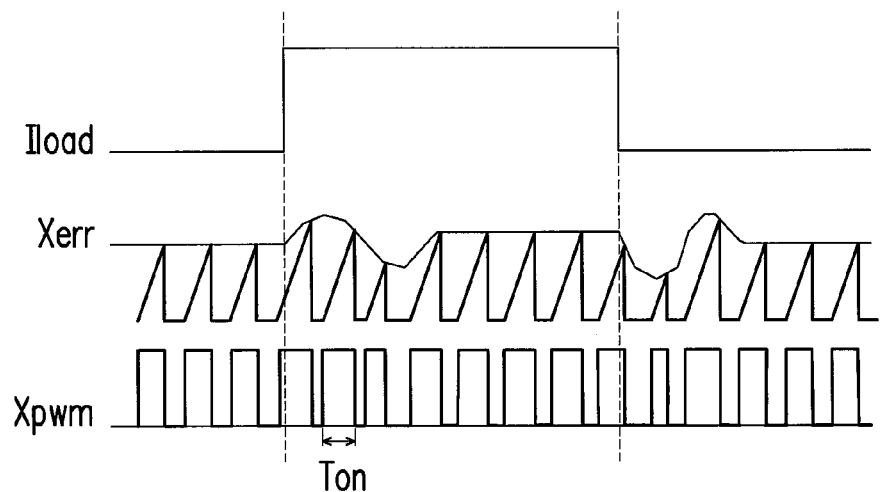
FIG. 4 is a waveform diagram of a conventional counting mechanism capable of adjusting an on time.
Figure 5:
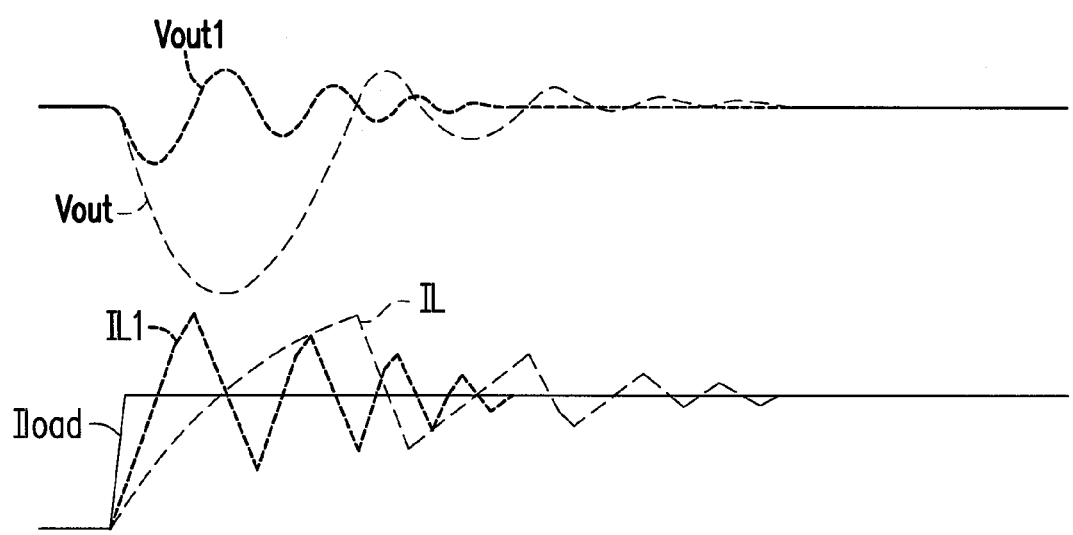
FIG. 5 is a waveform diagram of a constant type counting mechanism and a counting mechanism capable of adjusting an on time of the conventional technique.

Reference will now be made in detail to the present preferred embodiments of the invention, examples of which are illustrated in the accompanying drawings. Wherever possible, the same reference numbers are used in the drawings and the description to refer to the same or like parts.

In the following embodiments, when a device is described to be "connected" or "coupled" to another device, it is interpreted as that the device is directly connected to or coupled to the other device, or the device is indirectly connected to or coupled to the other device through other devices or connection means. A term "circuit" or "unit" represents at least one device or a plurality of devices, or devices actively and/or passively coupled to each other to provide a suitable function. A term "signal" represents at least one current, voltage, load, temperature, data or other signal. A ramp signal can also be a resemble ramp signal, a triangular wave signal or a sawtooth signal, which may have a repeat-descending type ramp or a repeat-rising type ramp, which is determined according to an actual application. It should be noticed that a physical property of the signals referred throughout the descriptions and figures can be voltage or current.

Figure 6:
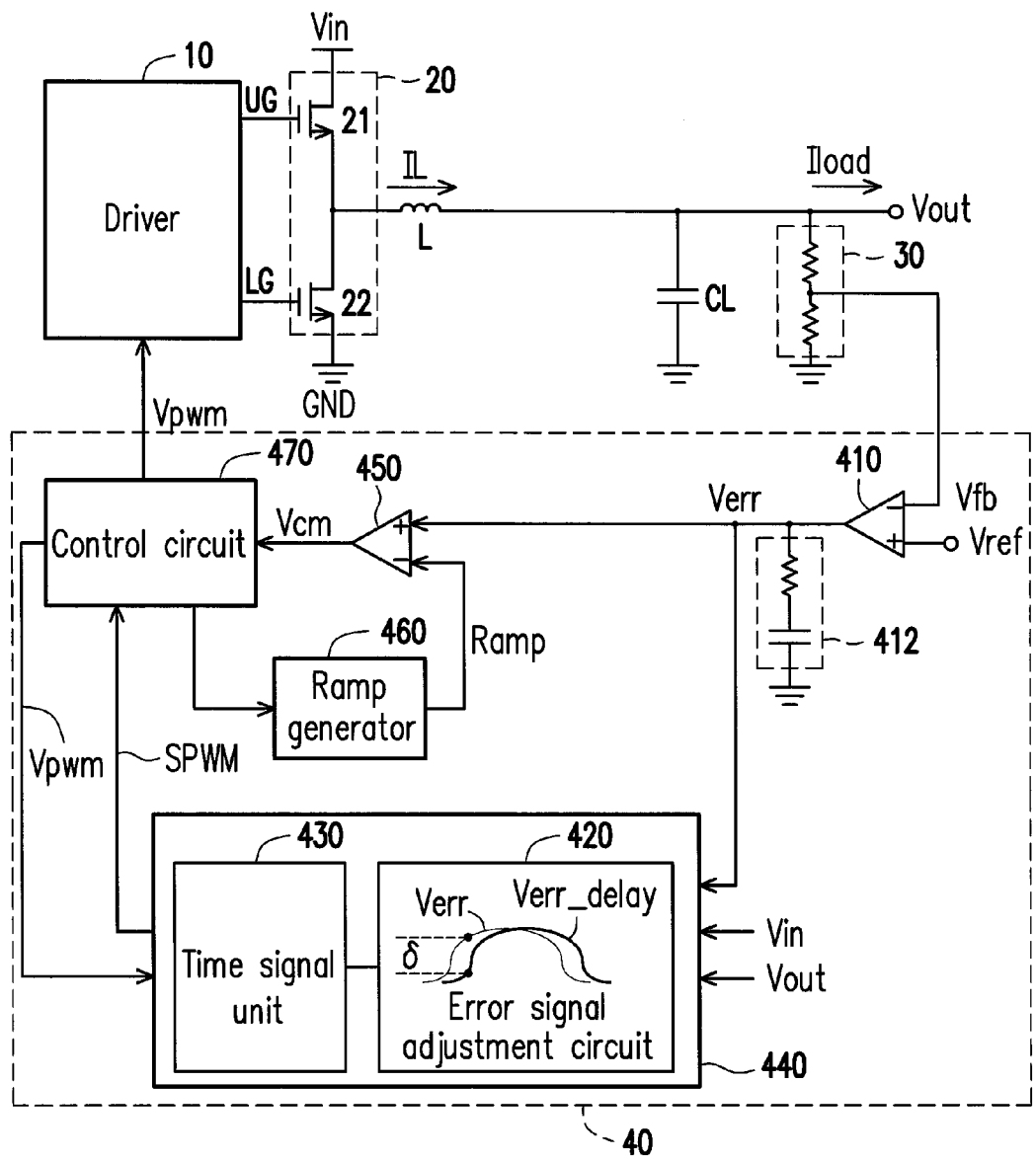
FIG. 6 is a structural schematic diagram of a power converter according to an embodiment of the invention.

FIG. 6 is a structural schematic diagram of a power converter according to an embodiment of the invention. Referring to FIG. 6, the power converter 600 includes a driver 10, an output stage 20, an inductor L, a capacitor CL, a feedback circuit 30 and a pulse width modulation (PWM) signal control circuit 40. The PWM signal control circuit 40 includes an error amplifier 410, a time signal generator 440, a comparator 450, a ramp generator 460 and a control circuit 470. The PWM signal control circuit 40 further includes a compensation circuit 412. The ramp generator 460 is controlled by the control circuit 470 to generate a ramp signal Ramp A first terminal of a high side switch 21 in the output stage 20 receives an input voltage Vin. A low side switch 22 is coupled between a second terminal of the high side switch 21 and the ground GND.

In an embodiment of the invention, the PWM signal control circuit 40 and the driver 10 can construct a direct current (DC)-DC controller, or the PWM signal control circuit 40 can directly serve as the DC-DC controller. Moreover, the PWM signal control circuit 40, the driver 10 and the output stage 20 can construct a DC-DC converter. In addition, when the DC-DC controller or the DC-DC converter is implemented in an integrated circuit, the compensation circuit 412 in the PWM signal control circuit 40 can be configured at external of the aforementioned integrated circuit.

The error amplifier 410 receives a feedback signal Vfb and a reference signal Vref to generate an error signal Verr. The error signal Verr relates to an output voltage Vout of the power converter 600.

The time signal generator 440 includes an error signal adjustment circuit 420 and a time signal unit 430. The time signal generator 440 receives the input voltage Vin, the output voltage Vout and the error signal Verr. The error signal adjustment circuit 420 receives and delays the error signal Verr to generate an error delay signal Verr_delay. Moreover, the error signal adjustment circuit 420 can process the error signal Verr and the error delay signal Verr_delay, and controls the time signal unit 430 to generate a time signal SPWM according to the processing result. For example, in an embodiment, the error signal adjustment circuit 420 generates a control signal Vton_hb shown in FIG. 7 according to the error signal Verr and the error delay signal Verr_delay to control the operation of the time signal unit 430. In another embodiment, the error signal adjustment circuit 420 generates a drain current Iton_error shown in FIG. 9 according to the error signal Verr and the error delay signal Verr_delay. Operations of the controls signal Vton_hb and the drain current Iton_err are described later. Therefore, the time signal unit 430 receives the control signal Vton_hb or the drain current Iton_err from the error signal adjustment circuit 420 to provide the time signal SPWM, and transmits the time signal SPWM to the control circuit 470.

A first input terminal and a second input terminal of the comparator 450 respectively receives the error signal Verr and the ramp signal Ramp, and outputs a comparison signal Vcm to the control circuit 470.

The feedback signal Vfb relates to the output voltage Vout of the power converter 600. In other embodiments, the feedback signal Vfb can be directly the output voltage Vout. The PWM signal control circuit 40 provides the time signal SPWM to change a length of on time in response to a load transient variation. The control circuit 470 generates a PWM signal Vpwm according to the time signal SPWM to control the power converter 600. Moreover, the control circuit 470 may further transmit the PWM signal Vpwm to the time signal generator 440. The driver 10 generates a high side switch control voltage UG and a low side switch control voltage LG according to the PWM signal Vpwm to respectively control the high side switch 21 and the low side switch 22. The output stage 20 is used for performing DC-DC conversion on the input voltage Vin, such that the power converter 600 can produce the output voltage Vout and output the output voltage Vout to a load.

In an embodiment of the invention, the PWM signal Vpwm can be a constant on time (COT) signal in case of a constant load (stable state). In case of the load transient variation, the PWM signal Vpwm can change a length of the on time to improve a response speed of the power converter 600, such that the output voltage Vout is quickly returned to a stable state and the transient response speed is increased.

Two embodiments of the time signal generator 440 are described in detail below.

Figure 7:
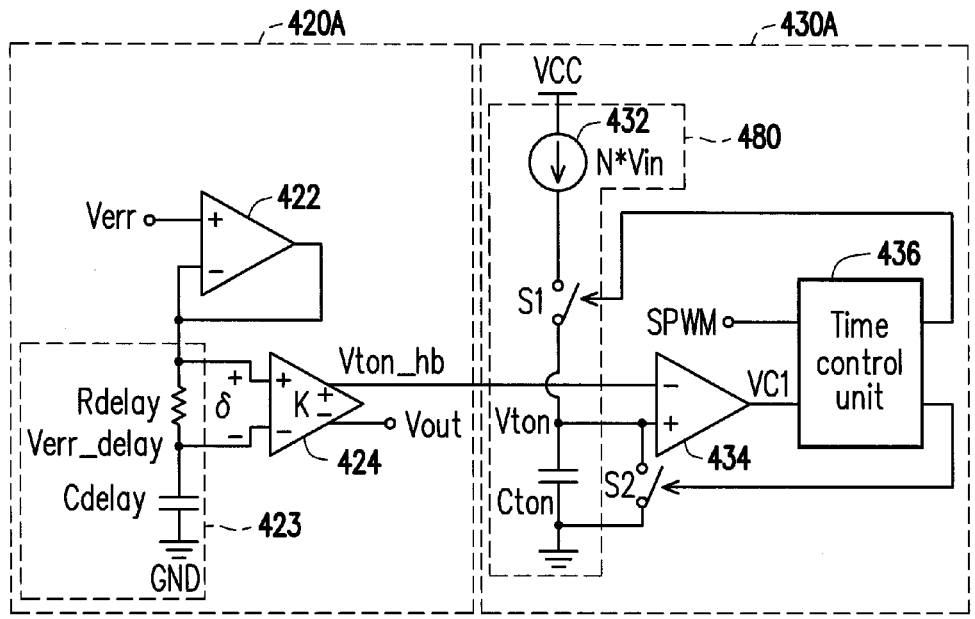
FIG. 7 is a circuit schematic diagram of a time signal generator according to a first embodiment of the invention.

FIG. 7 is a circuit schematic diagram of the time signal generator according to a first embodiment of the invention. Referring to FIG. 7, the time signal generator 440A includes an error signal adjustment circuit 420A and a time signal unit 430A. The error signal adjustment circuit 420A includes an input unit 422, a delay unit 423 and a conversion control device 424. The time signal unit 430A is configured to provide the time signal SPWM. The delay unit 423 includes a resistor Rdelay and a capacitor Cdelay. The delay unit 423 is coupled to the input unit 422, and generates the error delay signal Verr_delay according to the error signal Verr. The conversion control device 424 is coupled to the input unit 422, the delay unit 423 and the time signal unit 430A, and controls the time signal unit 430A to generate the time signal SPWM according to the error signal Verr and the error delay signal Verr_delay.

A first input terminal of the input unit 422 receives the error signal Verr. A first terminal of the resistor Rdelay is coupled to a second input terminal and an output terminal of the input unit 422. The capacitor Cdelay is coupled between a second terminal of the resistor Rdelay and the ground GND. A first input terminal and a second input terminal of the conversion control device 424 are respectively coupled to the first terminal and a second terminal of the resistor Rdelay. A third input terminal of the conversion control device 424 receives the output voltage Vout.

The input unit 422 can be an amplifier. The error signal Verr is connected to the resistor Rdelay and the capacitor Cdelay through a negative feedback of the amplifier 422, so as to generate the error delay signal Verr_delay on the capacitor Cdelay. A cross voltage of the resistor Rdelay is a difference δ, where δ=Verr−Verr_delay.

The conversion control device 424 receives the difference δ of the error signal Verr and the error delay signal Verr_delay, and controls the operation of the time signal unit 430A according to the difference δ. The conversion control device 424 can be a voltage-controlled voltage source (VCVS) device. The conversion control device 424 may have a K-multiple amplification coefficient, and can multiply the difference δ by the K-multiple amplification coefficient (K is greater than 1) to amplify the difference. Moreover, if the K-multiple amplification coefficient is between 0 and 1, the difference can be decreased. The conversion control device 424 performs an adding operation on the amplified difference (K*δ) and the output voltage Vout to provide the control signal Vton_hb to the time signal unit 430A. The control signal Vton_hb changes a counting upper boundary level of a counting signal VC1 along with the load transient variation.

The time signal unit 430A includes a comparator 434 and a charging unit 480. The charging unit 480 includes a current source 432, a switch S1 and a capacitor Cton. The current source 432 has an N-multiple amplification coefficient to produce a current value (N*Vin) that is N times greater than the input voltage Vin. A first terminal of the current source 432 is coupled to a working voltage VCC. A first terminal of the switch S1 is coupled to a second terminal of the current source 432. The capacitor Cton is coupled between a second terminal of the switch S1 and the ground GND.

Moreover, the time signal unit 430A further includes a switch S2 and a time control unit 436. The switch S2 is connected in parallel to the capacitor Cton. A second input terminal of the comparator 434 is coupled to the second terminal of the switch S1 and the charging unit 480. A first input terminal of the comparator 434 is coupled to the output of the conversion control device 424 for receiving the control signal Vton_hb.

The charging unit 480 charges the capacitor Cton by using the current source 432. A level of a charging voltage Vton of the capacitor Cton is increased from 0 to the level of the control signal Vton_hb, and then an output terminal of the capacitor 434 outputs the counting signal VC1. The counting signal VC1 can be used by the time control unit 436 to obtain a new on time through a counting processing. The time control unit 436 controls the switches S1 and S2 according to the counting signal VC1, and provides the time signal SPWM of a pulse wave form. When the switch S1 is turned on, the switch S2 is turned off. Conversely, when the switch S1 is turned off, the switch S2 is turned on.

Figure 8:
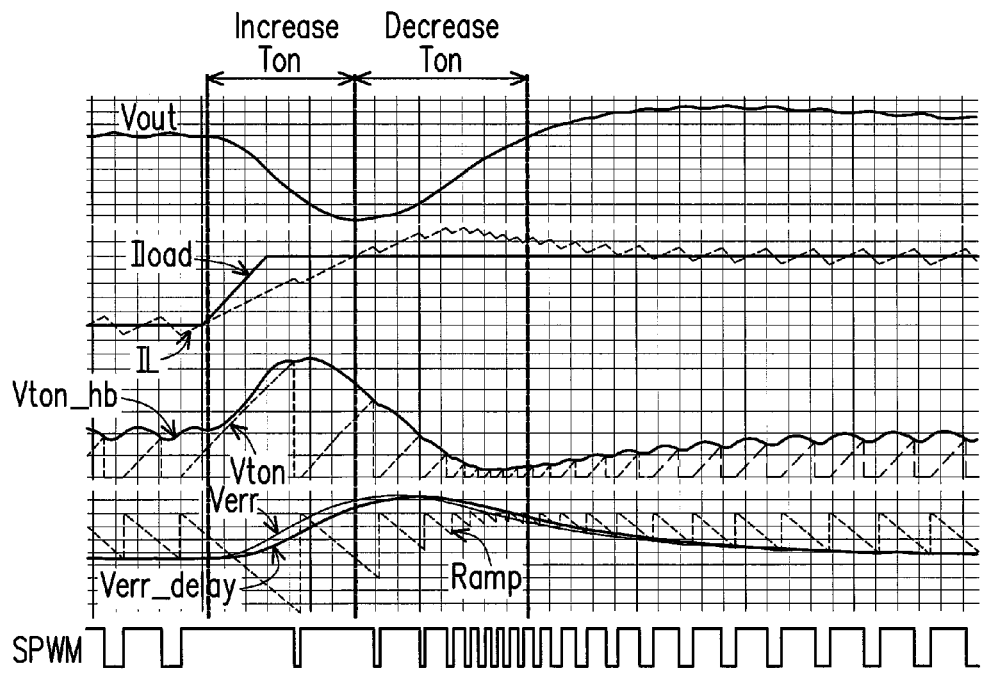
FIG. 8 is a waveform diagram of a power converter according to the first embodiment of the invention.

FIG. 8 is a waveform diagram of a power converter according to the first embodiment of the invention.

Referring to FIG. 6 to FIG. 8, when a waveform of the output voltage Vout drops due to a transient variation of a load current Iload, a waveform of the error signal Verr climbs up. Now, the error signal adjustment circuit 420A generates the difference δ according to the error signal Verr and the error delay signal Verr_delay, and reflects K times of the difference δ on the control signal Vton_hb. The control signal Vton_hb can be used to reflect an output variation, so as to increase the on time (Ton) in the time signal SPWM.

When the level of the inductor current IL is greater than the level of the load current Iload, the waveform of the output voltage Vout starts to climb up, and the waveform of the error signal Verr drops. Now, the error signal adjustment circuit 420A generates the difference δ according to the error signal Verr and the error delay signal Verr_delay, and reflects K times of the difference δ on the control signal Vton_hb. The control signal Vton_hb can be used to reflect variation of the output voltage Vout, so as to shorten the on time (Ton) in the time signal SPWM.

When the load current Iload has no transient variation (i.e. a DC value of the inductor current IL is equal to the load current Iload), the counting upper boundary level used for counting the on time (Ton) has no obvious variation, and the operation mode of the power converter 600 is returned to a COT mode of the normal state.

Figure 9:
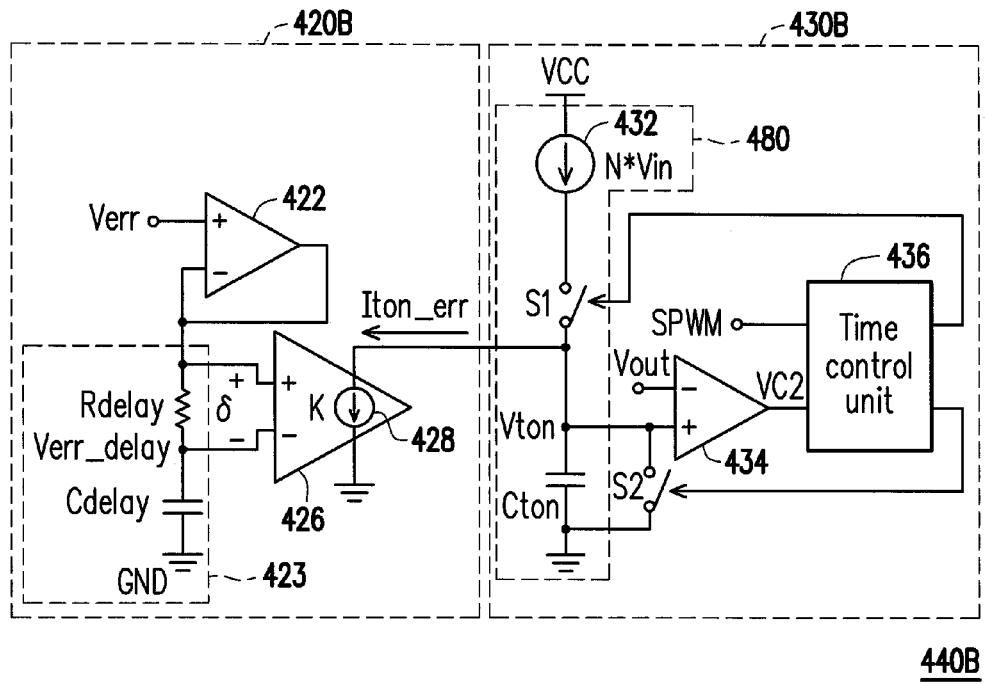
FIG. 9 is a circuit schematic diagram of a time signal generator according to a second embodiment of the invention.

FIG. 9 is a circuit schematic diagram of the time signal generator according to a second embodiment of the invention. Referring to FIG. 9, the time signal generator 440B includes an error signal adjustment circuit 420B and a time signal unit 430B. The error signal adjustment circuit 420B includes an input unit 422, a delay unit 423 and a conversion control device 426. The time signal unit 430B is configured to provide the time signal SPWM. The delay unit 423 includes a resistor Rdelay and a capacitor Cdelay. The delay unit 423 is coupled to the input unit 422, and generates the error delay signal Verr_delay according to the error signal Verr. The conversion control device 426 is coupled to the input unit 422, the delay unit 423 and the time signal unit 430B, and controls the time signal unit 430B to generate the time signal SPWM according to the error signal Verr and the error delay signal Verr_delay.

A first input terminal of the input unit 422 receives the error signal Verr. A first terminal of the resistor Rdelay is coupled to a second input terminal and an output terminal of the input unit 422. The capacitor Cdelay is coupled between a second terminal of the resistor Rdelay and the ground GND. A first input terminal and a second input terminal of the conversion control device 426 are respectively coupled to the first terminal and a second terminal of the resistor Rdelay. The conversion control device 426 includes a current source 428. A first terminal of the current source 428 is used for draining a drain current from the time signal unit 430B, and a second terminal of the current source 428 is coupled to the ground GND.

The input unit 422 can be an amplifier. The error signal Verr is connected to the resistor Rdelay and the capacitor Cdelay through a negative feedback of the amplifier 422, so as to generate the error delay signal Verr_delay on the capacitor Cdelay. A cross voltage of the resistor Rdelay is the difference δ, where δ=Verr−Verr_delay.

The conversion control device 426 can be a voltage-controlled current source (VCCS) device. The conversion control device 426 may have a K-multiple amplification coefficient, and can drain a drain current (Iton_err=K*δ) from the time signal unit 430B by multiplying the difference δ by the K-multiple amplification coefficient.

The time signal unit 430B includes a comparator 434 and a charging unit 480. The charging unit 480 includes a current source 432, a switch S1 and a capacitor Cton. The current source 432 has an N-multiple amplification coefficient to produce a current value (N*Vin) that is N times greater than the input voltage Vin. A first terminal of the current source 432 is coupled to a working voltage VCC. A first terminal of the switch S1 is coupled to a second terminal of the current source 432, and a second terminal of the switch S1 is coupled to the first terminal of the current source 428. The capacitor Cton is coupled between the second terminal of the switch S1 and the ground GND. A switch S2 is connected in parallel to the capacitor Cton. A second input terminal of the comparator 434 is coupled to the second terminal of the switch S1 and the conversion control device 426. A first input terminal of the comparator 434 receives the output voltage Vout.

Moreover, the time signal unit 430B further includes the switch S2 and a time control unit 436. The charging unit 480 charges the capacitor Cton by using a counting current (N*Vin−Iton_err). A level of the charging voltage Vton of the capacitor Cton is increased from 0 to the level of the output voltage Vout, and then an output terminal of the capacitor 434 outputs a counting signal VC2. The counting signal VC2 can be used by the time control unit 436 to obtain a new on time through a counting processing. The time control unit 436 controls the switches S1 and S2 according to the counting signal VC2, and provides the time signal SPWM of a pulse wave form. When the switch S1 is turned on, the switch S2 is turned off. Conversely, when the switch S1 is turned off, the switch S2 is turned on.

Figure 10:
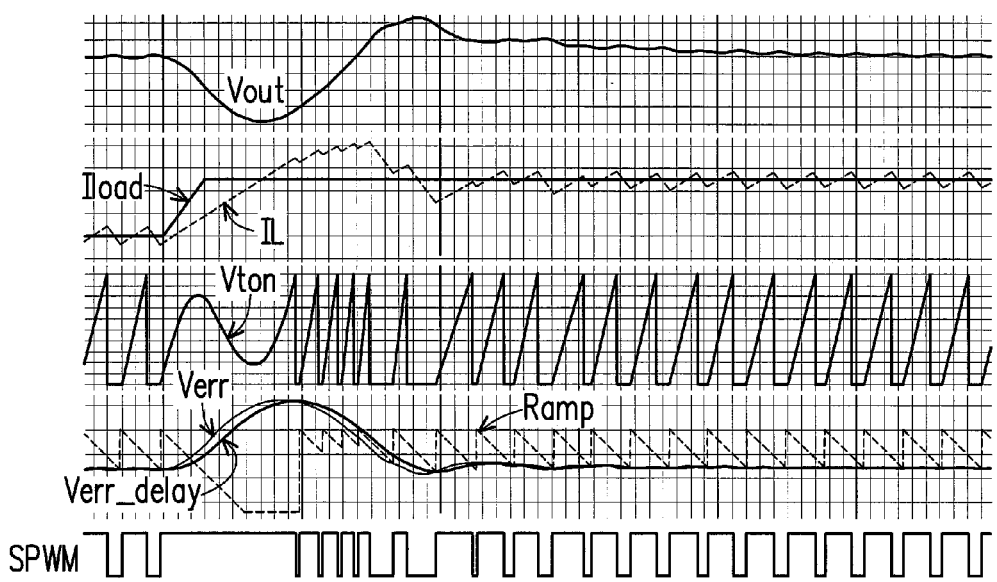
FIG. 10 is a waveform diagram of the power converter according to the second embodiment of the invention.

FIG. 10 is a waveform diagram of the power converter according to the second embodiment of the invention.

Referring to FIG. 6, FIG. 9 and FIG. 10, when a waveform of the output voltage Vout drops due to a transient variation of the load current Iload, a waveform of the error signal Verr climbs up. Now, the error signal adjustment circuit 420B generates the difference δ according to the error signal Verr and the error delay signal Verr_delay, and reflects K times of the difference δ on the drain current Iton_err. The drain current Iton_err can be used to reflect the output variation to decrease the counting current (N*Vin−Iton_err), such that a charging time of the capacitor Cton is increased to increase the on time (Ton) in the time signal SPWM.

When the level of the inductor current IL is greater than the level of the load current Iload, the waveform of the output voltage Vout starts to climb up, and the waveform of the error signal Verr drops. Now, the error signal adjustment circuit 420A generates the difference δ according to the error signal Verr and the error delay signal Verr_delay, and reflects K times of the difference δ on the drain current Iton_err. The drain current Iton_err can be used to reflect the output variation to shorten the charging time of the capacitor Cton, so as to shorten the on time (Ton) in the time signal SPWM.

When the load current Iload has no transient variation (i.e. a DC value of the inductor current IL is equal to the load current Iload), the counting current of the capacitor is maintained to a constant current (N*Vin) and has no obvious variation, and the operation mode of the power converter 600 is returned to the COT mode of the normal state.

Figure 11:
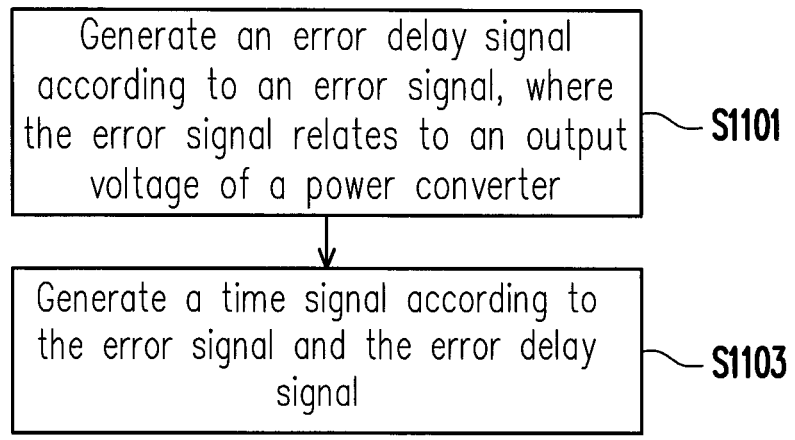
FIG. 11 and FIG. 12 are flowcharts illustrating a time signal generating method of a power converter according to an embodiment of the invention.
Figure 12:
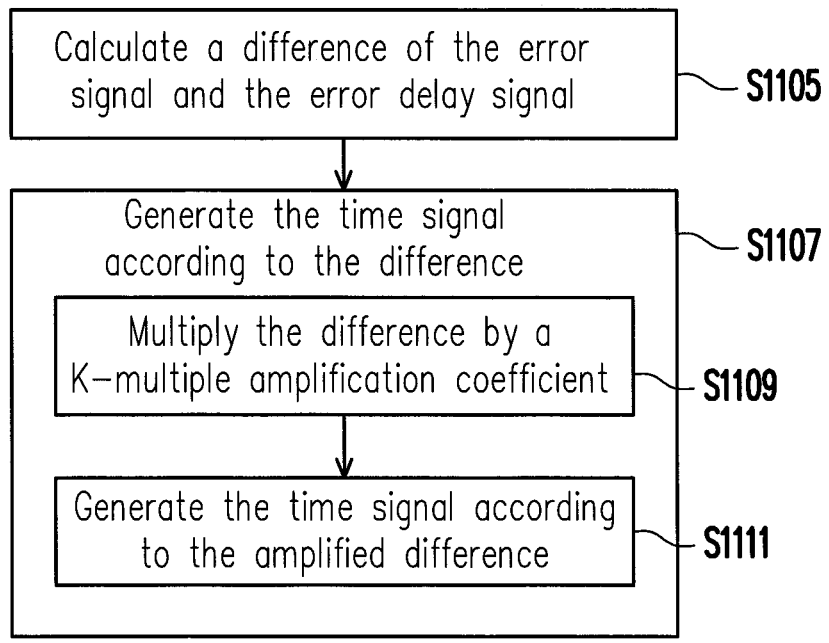

According to the above descriptions, a general time signal generating method of a power converter is deduced. In detail, FIG. 11 and FIG. 12 are flowcharts illustrating a time signal generating method of a power converter according to an embodiment of the invention. Referring to FIG. 6 and FIG. 11 first, the time signal generating method of the present embodiment may include following steps.

In step S1101, the error delay signal Verr_delay is generated according to the error signal Verr, where the error signal Verr relates to the output voltage Vout of the power converter 600. In step S1103, the time signal SPWM is generated according to the error signal Verr and the error delay signal Verr_delay.

Referring to FIG. 12, the step S1103 of generating the time signal according to the error signal and the error delay signal includes following steps. In step S1105, the difference δ of the error signal Verr and the error delay signal Verr_delay is calculated. Then, in step S1107, the time signal SPWM is generated according to the difference δ.

Moreover, the step S1107 may includes following steps. In step S1109, the difference δ is multiplied by a K-multiple amplification coefficient. In step S1111, the time signal SPWM is generated according to the amplified difference.

In summary, in the time signal generator and the time signal generating method of the invention, the time signal is generated according to the error signal and the error delay signal, so as to change a length of the on time in response to the load transient variation. The time signal can serve to improve a response speed of the power converter, such that the output voltage is quickly returned to a stable state and the transient response speed is increased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A time signal generator, adapted to a power converter, the time signal generator comprising: an input unit comprising an amplifier, receiving an error signal, wherein the error signal relates to an output voltage of the power converter; a delay unit comprising a resistor and a capacitor, coupled to the input unit, and generating an error delay signal according to the error signal; a time signal unit, configured to provide a time signal; and a conversion control device, coupled to the input unit, the delay unit and the time signal unit, and controlling the time signal unit to generate the time signal according to the error signal and the error delay signal, wherein the conversion control device receives a difference of the error signal and the error delay signal, and controls an operation of the time signal unit according to the difference; wherein a first input terminal of the input unit receives the error signal, a first terminal of the resistor is coupled to a second input terminal and an output terminal of the input unit, the capacitor is coupled between a second terminal of the resistor and ground, a first input terminal and a second input terminal of the conversion control device are respectively coupled to the first and second terminals of the resistor.

2. The time signal generator as claimed in claim 1, wherein the conversion control device has a K-multiple amplification coefficient, and the conversion control device receives the difference of the error signal and the error delay signal, and multiplies the difference by the K-multiple amplification coefficient to control the operation of the time signal unit.

3. The time signal generator as claimed in claim 1, wherein the time signal unit comprises a comparator, and a first input terminal of the comparator is coupled to an output of the conversion control device.

4. The time signal generator as claimed in claim 3, wherein the time signal unit further comprises a charging unit, and a second input terminal of the comparator is coupled to the charging unit.

5. The time signal generator as claimed in claim 1, wherein the time signal unit further comprises a comparator and a charging unit, a first input terminal of the comparator receives the output voltage, and a second input terminal of the comparator is coupled to the charging unit and the conversion control device.

6. The time signal generator as claimed in claim 1, wherein when the conversion control device is a voltage-controlled voltage source device, the conversion control device provides a control signal to the time control unit, and the control signal changes a length of the time signal of the time signal unit along with a load transient variation of the power converter.

7. The time signal generator as claimed in claim 1, wherein when the conversion control device is a voltage-controlled current source device, the conversion control device drains a drain current from the time signal unit, and the drain current changes a length of the time signal of the time signal unit along with a load transient variation of the power converter.

8. A time signal generator, adapted to a power converter, the time signal generator generating an error delay signal according to an error signal, and generating a time signal according to the error signal and the error delay signal, wherein the error signal relates to an output voltage of the power converter, wherein the time signal generator comprises: an input unit comprising an amplifier, receiving the error signal; and a delay unit comprising a resistor and a capacitor, coupled to the input unit, and generating the error delay signal according to the error signal, wherein the time signal generator receives a difference of the error signal and the error delay signal, and generates the time signal according to the difference; wherein a first input terminal of the input unit receives the error signal, a first terminal of the resistor is coupled to a second input terminal and an output terminal of the input unit, the capacitor is coupled between a second terminal of the resistor and ground, a first input terminal and a second input terminal of a conversion control device are respectively coupled to the first and second terminals of the resistor.

9. The time signal generator as claimed in claim 8, wherein the time signal generator comprises:
a time signal unit, configured to provide the time signal; and
the conversion control device, coupled to the input unit, the delay unit and the time signal unit, and controlling the time signal unit to generate the time signal according to the error signal and the error delay signal, wherein the conversion control device receives the difference of the error signal and the error delay signal, and controls an operation of the time signal unit according to the difference.

10. The time signal generator as claimed in claim 9, wherein the conversion control device has a K-multiple amplification coefficient, and the conversion control device receives the difference of the error signal and the error delay signal, and multiplies the difference by the K-multiple amplification coefficient to control the operation of the time signal unit.

11. The time signal generator as claimed in claim 9, wherein the time signal unit comprises a comparator, and a first input terminal of the comparator is coupled to an output of the conversion control device.

12. The time signal generator as claimed in claim 11, wherein the time signal unit further comprises a charging unit, and a second input terminal of the comparator is coupled to the charging unit.

13. The time signal generator as claimed in claim 9, wherein the time signal unit further comprises a comparator and a charging unit, a first input terminal of the comparator receives the output voltage, and a second input terminal of the comparator is coupled to the charging unit and the conversion control device.

14. The time signal generator as claimed in claim 9, wherein when the conversion control device is a voltage-controlled voltage source device, the conversion control device provides a control signal to the time control unit, and the control signal changes a length of the time signal of the time signal unit along with a load transient variation of the power converter.

15. The time signal generator as claimed in claim 9, wherein when the conversion control device is a voltage-controlled current source device, the conversion control device drains a drain current from the time signal unit, and the drain current changes a length of the time signal of the time signal unit along with a load transient variation of the power converter.

16. A time signal generating method, adapted to a power converter, the time signal generating method comprises: generating an error delay signal according to an error signal, wherein the error signal relates to an output voltage of the power converter; and generating a time signal according to the error signal and the error delay signal, wherein the step of generating the time signal according to the error signal and the error delay signal comprises: generating the error delay signal by connecting the error signal to an input unit and to a delay unit comprising a resistor and a capacitor; calculating the error delay signal on the capacitor; calculating a difference of the error signal and the error delay signal on a cross voltage of the resistor; and generating the time signal according to the difference.

17. The time signal generating method as claimed in claim 16, wherein the step of generating the time signal according to the difference comprises:
multiplying the difference by a K-multiple amplification coefficient; and
generating the time signal according to the amplified difference.

18. A time signal generator, adapted to a power converter, the time signal generator comprising: an error signal adjustment circuit, receiving an error signal to generate an error delay signal, wherein the error signal relates to an output voltage of the power converter; and a time signal unit, coupled to the error signal adjustment circuit, wherein the time signal unit generates a time signal according to a processing result of the error signal and the error delay signal, wherein the error signal adjustment circuit comprises: an input unit comprising an amplifier, receiving the error signal; and a delay unit comprising a resistor and a capacitor, coupled to the input unit, and generating the error delay signal according to the error signal, wherein the processing result of the error signal and the error delay signal is a difference of the error signal and the error delay signal, wherein a first input terminal of the input unit receives the error signal, a first terminal of the resistor is coupled to a second input terminal and an output terminal of the input unit, the capacitor is coupled between a second terminal of the resistor and ground, a first input terminal and a second input terminal of a conversion control device are respectively coupled to the first and second terminals of the resistor.

19. The time signal generator as claimed in claim 18, wherein the error signal adjustment circuit comprises:
the conversion control device, coupled to the input unit, the delay unit and the time signal unit, and controlling the time signal unit to generate the time signal according to the error signal and the error delay signal, wherein the conversion control device receives the difference of the error signal and the error delay signal, and controls an operation of the time signal unit according to the difference.

20. The time signal generator as claimed in claim 19, wherein the conversion control device has a K-multiple amplification coefficient, and the conversion control device receives the difference of the error signal and the error delay signal, and multiplies the difference by the K-multiple amplification coefficient to control the operation of the time signal unit.

21. The time signal generator as claimed in claim 19, wherein when the conversion control device is a voltage-controlled voltage source device, the conversion control device provides a control signal to the time control unit, and the control signal changes a length of the time signal of the time signal unit along with a load transient variation of the power converter.

22. The time signal generator as claimed in claim 19, wherein when the conversion control device is a voltage-controlled current source device, the conversion control device drains a drain current from the time signal unit, and the drain current changes a length of the time signal of the time signal unit along with a load transient variation of the power converter.

* * * * *